(12) United States Patent
Kotoku et al.

(10) Patent No.: US 9,783,003 B2
(45) Date of Patent: *Oct. 10, 2017

(54) PNEUMATIC TIRE

(71) Applicant: The Yokohama Rubber Co., LTD., Minato-ku, Tokyo (JP)

(72) Inventors: Koichi Kotoku, Hiratsuka (JP); Koshi Iga, Hiratsuka (JP); Hideki Hamanaka, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,400

(22) PCT Filed: Jun. 7, 2013

(86) PCT No.: PCT/JP2013/065845
§ 371 (c)(1),
(2) Date: Dec. 3, 2014

(87) PCT Pub. No.: WO2014/010350
PCT Pub. Date: Jan. 16, 2014

(65) Prior Publication Data
US 2015/0136296 A1    May 21, 2015

(30) Foreign Application Priority Data

Jul. 13, 2012  (WO) ................. PCT/JP2012/068025
Jul. 13, 2012  (WO) ................. PCT/JP2012/068026
Jul. 13, 2012  (WO) ................. PCT/JP2012/068027

(51) Int. Cl.
*B60C 9/22* (2006.01)
*B60C 9/18* (2006.01)
(Continued)

(52) U.S. Cl.
CPC ................. *B60C 9/20* (2013.01); *B60C 3/04* (2013.01); *B60C 9/18* (2013.01); *B60C 9/185* (2013.01);
(Continued)

(58) Field of Classification Search
CPC ...... B60C 9/20; B60C 2009/2266; B60C 9/22
(Continued)

(56) References Cited

U.S. PATENT DOCUMENTS 3,939,890 A    2/1976 Abe
4,215,734 A    8/1980 Suzuki et al.
(Continued)

FOREIGN PATENT DOCUMENTS

CN    1211216    3/1999
CN    1809474    7/2006
(Continued)

OTHER PUBLICATIONS

Machine Translation: JP07081310A; Funato, N; No date.*
(Continued)

*Primary Examiner* — Michael H Wilson
*Assistant Examiner* — Kendra Ly
(74) *Attorney, Agent, or Firm* — Thorpe North & Western

(57) ABSTRACT

A pneumatic tire includes an inner-side cross belt and an outer-side cross belt forming belt angles of mutually different signs with the tire circumferential direction with absolute values from 46° to 80°, inclusive; a circumferential reinforcing layer arranged between the inner-side cross belt and the outer-side cross belt and forming a belt angle of ±5° with the tire circumferential direction; and a supplemental belt arranged outside the outer-side cross belt in the radial direction of the tire and forming a belt angle with the tire circumferential direction with an absolute value between 10° and 45° inclusive.

16 Claims, 11 Drawing Sheets

(51) Int. Cl.
  *B60C 9/20* (2006.01)
  *B60C 9/28* (2006.01)
  *B60C 11/00* (2006.01)
  *B60C 11/13* (2006.01)
  *B60C 3/04* (2006.01)
  *B60C 11/03* (2006.01)

(52) U.S. Cl.
  CPC .............. *B60C 9/2006* (2013.01); *B60C 9/22* (2013.01); *B60C 9/28* (2013.01); *B60C 11/0083* (2013.01); *B60C 11/03* (2013.01); *B60C 11/0306* (2013.01); *B60C 11/1392* (2013.01); *B60C 2009/2012* (2013.01); *B60C 2009/2016* (2013.01); *B60C 2009/2019* (2013.01); *B60C 2009/2022* (2013.01); *B60C 2009/2041* (2013.01); *B60C 2009/2061* (2013.01); *B60C 2009/2064* (2013.01); *B60C 2009/2077* (2013.01); *B60C 2009/2083* (2013.01); *B60C 2009/283* (2013.01); *Y10T 152/10801* (2015.01)

(58) Field of Classification Search
  USPC .......................................... 152/454, 534–535
  See application file for complete search history.

(56) References Cited

U.S. PATENT DOCUMENTS

| | | | |
|---|---|---|---|
| 4,688,615 A | 8/1987 | Lee | |
| 4,702,293 A * | 10/1987 | Iwata | B29D 30/08 152/454 |
| 4,724,878 A * | 2/1988 | Kabe | B60C 11/00 152/209.14 |
| 5,318,643 A * | 6/1994 | Mizner | B32B 25/02 152/451 |
| 5,337,162 A | 8/1994 | Sakano | |
| 5,660,654 A * | 8/1997 | Miyazaki | B60C 9/2006 152/526 |
| 5,662,752 A * | 9/1997 | Nakano | B60C 9/20 152/526 |
| 5,674,331 A | 10/1997 | Saeki et al. | |
| 6,082,425 A | 7/2000 | Colom | |
| 6,401,780 B1 | 6/2002 | Patitsas et al. | |
| 6,619,357 B1 * | 9/2003 | Gillard | B60C 9/0007 152/531 |
| 6,659,147 B1 * | 12/2003 | Cordonnier | B60C 9/22 152/526 |
| 6,668,889 B1 * | 12/2003 | Losey | B60C 9/20 152/527 |
| 2004/0069392 A1 | 4/2004 | Maruoka et al. | |
| 2006/0169380 A1 | 8/2006 | Radulescu et al. | |
| 2006/0169381 A1 | 8/2006 | Radulescu et al. | |
| 2006/0169383 A1 | 8/2006 | Radulescu et al. | |
| 2007/0056672 A1 | 3/2007 | Yamanaka | |
| 2009/0277552 A1 | 11/2009 | Maruyama et al. | |
| 2011/0114238 A1 * | 5/2011 | Takahashi | B60C 3/04 152/538 |
| 2011/0192516 A1 | 8/2011 | Yamaguchi et al. | |
| 2011/0220259 A1 * | 9/2011 | Suzuki | B60C 11/00 152/209.18 |
| 2012/0055604 A1 * | 3/2012 | Nakayama | B60C 3/04 152/526 |
| 2014/0166178 A1 | 6/2014 | Sato | |
| 2014/0196826 A1 | 7/2014 | Kobayashi | |
| 2014/0305566 A1 | 10/2014 | Mashiyama | |
| 2014/0345766 A1 | 11/2014 | Wang | |

FOREIGN PATENT DOCUMENTS

| | | | | |
|---|---|---|---|---|
| FR | 1437569 A | * | 5/1966 | ............... B60C 9/20 |
| JP | S50-138503 | | 11/1975 | |
| JP | S54-033407 | | 3/1979 | |
| JP | 61113503 A | * | 5/1986 | |
| JP | 63159105 A | * | 7/1988 | |
| JP | 01101201 A | * | 4/1989 | |
| JP | 02155804 A | * | 6/1990 | |
| JP | 02225103 A | * | 9/1990 | |
| JP | 03099903 A | * | 4/1991 | |
| JP | 03104705 A | * | 5/1991 | |
| JP | 07081310 A | * | 3/1995 | |
| JP | H08-244420 | | 9/1996 | |
| JP | EP 0790142 A1 | * | 8/1997 | ............... B60C 3/04 |
| JP | 2006-111217 | | 4/2006 | |
| JP | 2006-183211 | | 7/2006 | |
| JP | 2009-001092 | | 1/2009 | |
| JP | 4642760 | | 3/2011 | |
| JP | 4642760 | | 4/2011 | |
| JP | 4663638 | | 4/2011 | |
| JP | 4663639 | | 4/2011 | |
| JP | 4911267 | | 4/2012 | |
| JP | 4918948 | | 4/2012 | |
| JP | 4952864 | | 6/2012 | |
| JP | 4973810 | | 7/2012 | |
| WO | WO 97/30856 | | 8/1997 | |
| WO | WO 03/051651 | | 6/2003 | |
| WO | WO 2004/103736 | | 12/2004 | |
| WO | WO 2005/016666 | | 2/2005 | |
| WO | WO 2005/016667 | | 2/2005 | |
| WO | WO 2005/016668 | | 2/2005 | |
| WO | WO 2008/093537 | | 8/2008 | |
| WO | WO 2010/041720 | | 4/2010 | |

OTHER PUBLICATIONS

Machine Translation: FR 1437569 A; Dunlop SA; no date.*
Machine Translation: JP 02225103 A; Asano, Kazuo; no date.*
International Search Report for International Application No. PCT/JP2013/065845 dated Jul. 9, 2013, 4 pages, Japan.

* cited by examiner

| | CONVENTIONAL EXAMPLE | COMPARATIVE EXAMPLE 1 | COMPARATIVE EXAMPLE 2 | WORKING EXAMPLE 1 | WORKING EXAMPLE 2 | WORKING EXAMPLE 3 |
|---|---|---|---|---|---|---|
| BELT ANGLE OF CROSS BELTS (°) | 20 | 50 | 60 | 46 | 60 | 80 |
| POSITION OF CIRCUMFERENTIAL REINFORCING LAYER RELATIVE TO CROSS BELTS | IN-BETWEEN | INNER SIDE | IN-BETWEEN | IN-BETWEEN | IN-BETWEEN | IN-BETWEEN |
| PRESENCE OF SUPPLEMENTAL BELT | YES | NONE | YES | YES | YES | YES |
| BELT ANGLE OF SUPPLEMENTAL BELT (°) | 20 | - | 10 | 10 | 10 | 10 |
| POSITION OF SUPPLEMENTAL BELT RELATIVE TO CROSS BELTS | OUTER SIDE | - | INNER SIDE | OUTER SIDE | OUTER SIDE | OUTER SIDE |
| ORIENTATION OF BELT ANGLES FOR SUPPLEMENTAL BELT AND ADJACENT CROSS BELT | SAME SIGN | - | DIFFERENT SIGN | DIFFERENT SIGN | DIFFERENT SIGN | DIFFERENT SIGN |
| PRESENCE OF HIGH-ANGLE BELT | PRESENT | NONE | NONE | NONE | NONE | NONE |
| Wb4/Wb3 | 0.70 | - | 0.70 | 0.70 | 0.70 | 0.70 |
| SUPPLEMENTAL BELT END COUNT (STRANDS PER 50 mm) | 13 | - | 13 | 13 | 13 | 13 |
| Yc/Ya | 0.78 | 0.75 | 0.78 | 0.78 | 0.78 | 0.78 |
| Wb2/Wca | 0.70 | 0.70 | 0.70 | 0.70 | 0.70 | 0.70 |
| Ws/Wca | 0.55 | 0.80 | 0.55 | 0.55 | 0.55 | 0.55 |
| Wg/SW | 0.83 | 0.85 | 0.83 | 0.83 | 0.83 | 0.83 |
| (Hcc−Hsh)/Hcc | 0.020 | 0.020 | 0.020 | 0.020 | 0.020 | 0.020 |
| Wsh/TW | 0.25 | 0.23 | 0.25 | 0.25 | 0.25 | 0.25 |
| Wsh/Wcc | 1.33 | 1.35 | 1.33 | 1.33 | 1.33 | 1.33 |
| TW/Wca | 0.93 | 0.93 | 0.93 | 0.93 | 0.93 | 0.93 |
| STEERING STABILITY | 100 | 101 | 104 | 104 | 109 | 105 |

FIG. 6A

| | WORKING EXAMPLE 4 | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 |
|---|---|---|---|---|---|---|---|
| BELT ANGLE OF CROSS BELTS (°) | 60 | 60 | 60 | 60 | 60 | 60 | 60 |
| POSITION OF CIRCUMFERENTIAL REINFORCING LAYER RELATIVE TO CROSS BELTS | IN-BETWEEN | IN-BETWEEN | IN-BETWEEN | IN-BETWEEN | IN-BETWEEN | IN-BETWEEN | IN-BETWEEN |
| PRESENCE OF SUPPLEMENTAL BELT | YES | YES | YES | YES | YES | YES | YES |
| BELT ANGLE OF SUPPLEMENTAL BELT (°) | 20 | 30 | 45 | 20 | 20 | 20 | 20 |
| POSITION OF SUPPLEMENTAL BELT RELATIVE TO CROSS BELTS | OUTER SIDE | OUTER SIDE | OUTER SIDE | OUTER SIDE | OUTER SIDE | OUTER SIDE | OUTER SIDE |
| ORIENTATION OF BELT ANGLES FOR SUPPLEMENTAL BELT AND ADJACENT CROSS BELT | DIFFERENT SIGN | DIFFERENT SIGN | DIFFERENT SIGN | SAME SIGN | SAME SIGN | SAME SIGN | SAME SIGN |
| PRESENCE OF HIGH-ANGLE BELT | NONE | NONE | NONE | NONE | NONE | NONE | NONE |
| Wb4/Wb3 | 0.70 | 0.70 | 0.70 | 0.70 | 0.75 | 0.85 | 0.95 |
| SUPPLEMENTAL BELT END COUNT (STRANDS PER 50 mm) | 13 | 13 | 13 | 13 | 13 | 13 | 13 |
| Yc/Ya | 0.78 | 0.78 | 0.78 | 0.78 | 0.78 | 0.78 | 0.78 |
| Wb2/Wca | 0.70 | 0.70 | 0.70 | 0.70 | 0.70 | 0.70 | 0.70 |
| Ws/Wca | 0.55 | 0.55 | 0.55 | 0.55 | 0.55 | 0.55 | 0.55 |
| Wg/SW | 0.83 | 0.83 | 0.83 | 0.83 | 0.83 | 0.83 | 0.83 |
| (Hcc-Hsh)/Hcc | 0.020 | 0.020 | 0.020 | 0.020 | 0.020 | 0.020 | 0.020 |
| Wsh/TW | 0.25 | 0.25 | 0.25 | 0.25 | 0.25 | 0.25 | 0.25 |
| Wsh/Wcc | 1.33 | 1.33 | 1.33 | 1.33 | 1.33 | 1.33 | 1.33 |
| TW/Wca | 0.93 | 0.93 | 0.93 | 0.93 | 0.93 | 0.93 | 0.93 |
| STEERING STABILITY | 111 | 107 | 106 | 114 | 115 | 117 | 116 |

FIG. 6B

| | WORKING EXAMPLE 11 | WORKING EXAMPLE 12 | WORKING EXAMPLE 13 | WORKING EXAMPLE 14 | WORKING EXAMPLE 15 | WORKING EXAMPLE 16 |
|---|---|---|---|---|---|---|
| BELT ANGLE OF CROSS BELTS (°) | 60 | 60 | 60 | 60 | 60 | 60 |
| POSITION OF CIRCUMFERENTIAL REINFORCING LAYER RELATIVE TO CROSS BELTS | IN-BETWEEN | IN-BETWEEN | IN-BETWEEN | IN-BETWEEN | IN-BETWEEN | IN-BETWEEN |
| PRESENCE OF SUPPLEMENTAL BELT | YES | YES | YES | YES | YES | YES |
| BELT ANGLE OF SUPPLEMENTAL BELT (°) | 20 | 20 | 20 | 20 | 20 | 20 |
| POSITION OF SUPPLEMENTAL BELT RELATIVE TO CROSS BELTS | OUTER SIDE | OUTER SIDE | OUTER SIDE | OUTER SIDE | OUTER SIDE | OUTER SIDE |
| ORIENTATION OF BELT ANGLES FOR SUPPLEMENTAL BELT AND ADJACENT CROSS BELT | SAME SIGN | SAME SIGN | SAME SIGN | SAME SIGN | SAME SIGN | SAME SIGN |
| PRESENCE OF HIGH-ANGLE BELT | NONE | NONE | NONE | NONE | NONE | NONE |
| Wb4/Wb3 | 0.85 | 0.85 | 0.85 | 0.85 | 0.85 | 0.85 |
| SUPPLEMENTAL BELT END COUNT (STRANDS PER 50 mm) | 15 | 20 | 25 | 20 | 20 | 20 |
| Yc/Ya | 0.78 | 0.78 | 0.78 | 0.80 | 0.85 | 0.90 |
| Wb2/Wca | 0.70 | 0.70 | 0.70 | 0.70 | 0.70 | 0.70 |
| Ws/Wca | 0.55 | 0.55 | 0.55 | 0.55 | 0.55 | 0.55 |
| Wg/SW | 0.83 | 0.83 | 0.83 | 0.83 | 0.83 | 0.83 |
| (Hcc-Hsh)/Hcc | 0.020 | 0.020 | 0.020 | 0.020 | 0.020 | 0.020 |
| Wsh/TW | 0.25 | 0.25 | 0.25 | 0.25 | 0.25 | 0.25 |
| Wsh/Wcc | 1.33 | 1.33 | 1.33 | 1.33 | 1.33 | 1.33 |
| TW/Wca | 0.93 | 0.93 | 0.93 | 0.93 | 0.93 | 0.93 |
| STEERING STABILITY | 118 | 120 | 119 | 121 | 123 | 122 |

FIG. 7A

| | WORKING EXAMPLE 17 | WORKING EXAMPLE 18 | WORKING EXAMPLE 19 | WORKING EXAMPLE 20 | WORKING EXAMPLE 21 | WORKING EXAMPLE 22 |
|---|---|---|---|---|---|---|
| BELT ANGLE OF CROSS BELTS (°) | 60 | 60 | 60 | 60 | 60 | 60 |
| POSITION OF CIRCUMFERENTIAL REINFORCING LAYER RELATIVE TO CROSS BELTS | IN-BETWEEN | IN-BETWEEN | IN-BETWEEN | IN-BETWEEN | IN-BETWEEN | IN-BETWEEN |
| PRESENCE OF SUPPLEMENTAL BELT | YES | YES | YES | YES | YES | YES |
| BELT ANGLE OF SUPPLEMENTAL BELT (°) | 20 | 20 | 20 | 20 | 20 | 20 |
| POSITION OF SUPPLEMENTAL BELT RELATIVE TO CROSS BELTS | OUTER SIDE | OUTER SIDE | OUTER SIDE | OUTER SIDE | OUTER SIDE | OUTER SIDE |
| ORIENTATION OF BELT ANGLES FOR SUPPLEMENTAL BELT AND ADJACENT CROSS BELT | SAME SIGN | SAME SIGN | SAME SIGN | SAME SIGN | SAME SIGN | SAME SIGN |
| PRESENCE OF HIGH-ANGLE BELT | NONE | NONE | NONE | NONE | NONE | NONE |
| Wb4/Wb3 | 0.85 | 0.85 | 0.85 | 0.85 | 0.85 | 0.85 |
| SUPPLEMENTAL BELT END COUNT (STRANDS PER 50 mm) | 20 | 20 | 20 | 20 | 20 | 20 |
| $Yc/Ya$ | 0.85 | 0.85 | 0.85 | 0.85 | 0.85 | 0.85 |
| $Wb2/Wca$ | 0.73 | 0.80 | 0.89 | 0.80 | 0.80 | 0.80 |
| $Ws/Wca$ | 0.55 | 0.55 | 0.55 | 0.60 | 0.65 | 0.70 |
| $Wg/SW$ | 0.83 | 0.83 | 0.83 | 0.83 | 0.83 | 0.83 |
| $(Hcc-Hsh)/Hcc$ | 0.020 | 0.020 | 0.020 | 0.020 | 0.020 | 0.020 |
| $Wsh/TW$ | 0.25 | 0.25 | 0.25 | 0.25 | 0.25 | 0.25 |
| $Wsh/Wcc$ | 1.33 | 1.33 | 1.33 | 1.33 | 1.33 | 1.33 |
| $TW/Wca$ | 0.93 | 0.93 | 0.93 | 0.93 | 0.93 | 0.93 |
| STEERING STABILITY | 123 | 125 | 124 | 126 | 128 | 127 |

FIG. 7B

| | WORKING EXAMPLE 23 | WORKING EXAMPLE 24 | WORKING EXAMPLE 25 | WORKING EXAMPLE 26 | WORKING EXAMPLE 27 | WORKING EXAMPLE 28 | WORKING EXAMPLE 29 |
|---|---|---|---|---|---|---|---|
| BELT ANGLE OF CROSS BELTS (°) | 60 | 60 | 60 | 60 | 60 | 60 | 60 |
| POSITION OF CIRCUMFERENTIAL REINFORCING LAYER RELATIVE TO CROSS BELTS | IN-BETWEEN | IN-BETWEEN | IN-BETWEEN | IN-BETWEEN | IN-BETWEEN | IN-BETWEEN | IN-BETWEEN |
| PRESENCE OF SUPPLEMENTAL BELT | YES | YES | YES | YES | YES | YES | YES |
| BELT ANGLE OF SUPPLEMENTAL BELT (°) | 20 | 20 | 20 | 20 | 20 | 20 | 20 |
| POSITION OF SUPPLEMENTAL BELT RELATIVE TO CROSS BELTS | OUTER SIDE | OUTER SIDE | OUTER SIDE | OUTER SIDE | OUTER SIDE | OUTER SIDE | OUTER SIDE |
| ORIENTATION OF BELT ANGLES FOR SUPPLEMENTAL BELT AND ADJACENT CROSS BELT | SAME SIGN | SAME SIGN | SAME SIGN | SAME SIGN | SAME SIGN | SAME SIGN | SAME SIGN |
| PRESENCE OF HIGH-ANGLE BELT | NONE | NONE | NONE | NONE | NONE | NONE | NONE |
| Wb4/Wb3 | 0.85 | 0.85 | 0.85 | 0.85 | 0.85 | 0.85 | 0.85 |
| SUPPLEMENTAL BELT END COUNT (STRANDS PER 50 mm) | 20 | 20 | 20 | 20 | 20 | 20 | 20 |
| Yc/Ya | 0.85 | 0.85 | 0.85 | 0.85 | 0.85 | 0.85 | 0.85 |
| Wb2/Wca | 0.80 | 0.80 | 0.80 | 0.80 | 0.80 | 0.80 | 0.80 |
| Ws/Wca | 0.65 | 0.65 | 0.65 | 0.65 | 0.65 | 0.65 | 0.65 |
| Wg/SW | 0.60 | 0.70 | 0.80 | 0.70 | 0.70 | 0.70 | 0.70 |
| (Hcc-Hsh)/Hcc | 0.020 | 0.020 | 0.020 | 0.010 | 0.013 | 0.015 | 0.010 |
| Wsh/TW | 0.25 | 0.25 | 0.25 | 0.25 | 0.25 | 0.25 | 0.10 |
| Wsh/Wcc | 1.33 | 1.33 | 1.33 | 1.33 | 1.33 | 1.33 | 1.33 |
| TW/Wca | 0.93 | 0.93 | 0.93 | 0.93 | 0.93 | 0.93 | 0.93 |
| STEERING STABILITY | 129 | 131 | 130 | 134 | 133 | 132 | 135 |

FIG. 8A

| | WORKING EXAMPLE 30 | WORKING EXAMPLE 31 | WORKING EXAMPLE 32 | WORKING EXAMPLE 33 | WORKING EXAMPLE 34 | WORKING EXAMPLE 35 | WORKING EXAMPLE 36 |
|---|---|---|---|---|---|---|---|
| BELT ANGLE OF CROSS BELTS (°) | 60 | 60 | 60 | 60 | 60 | 60 | 60 |
| POSITION OF CIRCUMFERENTIAL REINFORCING LAYER RELATIVE TO CROSS BELTS | IN-BETWEEN | IN-BETWEEN | IN-BETWEEN | IN-BETWEEN | IN-BETWEEN | IN-BETWEEN | IN-BETWEEN |
| PRESENCE OF SUPPLEMENTAL BELT | YES | YES | YES | YES | YES | YES | YES |
| BELT ANGLE OF SUPPLEMENTAL BELT (°) | 20 | 20 | 20 | 20 | 20 | 20 | 20 |
| POSITION OF SUPPLEMENTAL BELT RELATIVE TO CROSS BELTS | OUTER SIDE | OUTER SIDE | OUTER SIDE | OUTER SIDE | OUTER SIDE | OUTER SIDE | OUTER SIDE |
| ORIENTATION OF BELT ANGLES FOR SUPPLEMENTAL BELT AND ADJACENT CROSS BELT | SAME SIGN | SAME SIGN | SAME SIGN | SAME SIGN | SAME SIGN | SAME SIGN | SAME SIGN |
| PRESENCE OF HIGH-ANGLE BELT | NONE | NONE | NONE | NONE | NONE | NONE | NONE |
| Wb4/Wb3 | 0.85 | 0.85 | 0.85 | 0.85 | 0.85 | 0.85 | 0.85 |
| SUPPLEMENTAL BELT END COUNT (STRANDS PER 50 mm) | 20 | 20 | 20 | 20 | 20 | 20 | 20 |
| Yc/Ya | 0.85 | 0.85 | 0.85 | 0.85 | 0.85 | 0.85 | 0.85 |
| Wb2/Wca | 0.80 | 0.80 | 0.80 | 0.80 | 0.80 | 0.8 | 0.8 |
| Ws/Wca | 0.65 | 0.65 | 0.65 | 0.65 | 0.65 | 0.65 | 0.65 |
| Wg/SW | 0.70 | 0.70 | 0.70 | 0.70 | 0.70 | 0.75 | 0.75 |
| (Hcc−Hsh)/Hcc | 0.010 | 0.010 | 0.010 | 0.010 | 0.010 | 0.01 | 0.01 |
| Wsh/TW | 0.15 | 0.20 | 0.15 | 0.15 | 0.15 | 0.15 | 0.15 |
| Wsh/Wcc | 1.33 | 1.33 | 0.80 | 1.10 | 1.30 | 1.1 | 1.1 |
| TW/Wca | 0.93 | 0.93 | 0.93 | 0.93 | 0.93 | 0.91 | 0.82 |
| STEERING STABILITY | 137 | 136 | 138 | 140 | 139 | 142 | 141 |

FIG. 8B

PNEUMATIC TIRE

TECHNICAL FIELD

The present technology relates to a pneumatic tire and particularly relates to a pneumatic tire whereby steering stability of the tire can be enhanced.

BACKGROUND

A circumferential reinforcing layer may be arranged in the belt layer of a low-profile heavy-duty tire that is installed on a truck or bus to thereby equalize the contact pressure distribution applied in the width direction of the tire. Conventional pneumatic tires configured in this manner are disclosed in Japanese Patent Nos. 4642760, 4663638 and 4663639, as well as in Japanese Unexamined Patent Application Publication Nos. 2009-1092A, 2006-111217A, and 2006-183211A.

However, there is a problem in that steering stability of the pneumatic tires needs to be improved.

SUMMARY

The present technology, developed in view of the foregoing, provides a pneumatic tire capable of improving the steering stability of the tire using the circumferential reinforcing layer.

A pneumatic tire includes a carcass layer; a belt layer arranged outside of the carcass layer in the radial direction of the tire; at least three main circumferential grooves provided with a tread rubber arranged outside the belt layer in the radial direction of the tire and extending along the circumferential direction of the tire; and a plurality of land portions defined by the circumferential main grooves; the belt layer including an inner-side cross belt and an outer-side cross belt forming belt angles of mutually different signs with the tire circumferential direction with an absolute value from 46° to 80°, inclusive, a circumferential reinforcing layer arranged between the inner-side cross belt and the outer-side cross belt and forming a belt angle of ±5° with the tire circumferential direction; and a supplemental belt arranged outside of cross belts in the radial direction of the tire and forming a belt angle with the tire circumferential direction with an absolute value from 10° to 45°, inclusive.

In the pneumatic tire according to the present technology, the pair of cross belts function as high-angle belts, maintaining the rigidity of the tire in the width direction. The circumferential reinforcing layer and the supplemental belt function as low-angle belts maintaining the rigidity of the tire in the circumferential direction. Hereby, the rigidity of the tire in the circumferential direction and the rigidity of the tire in the width direction are appropriately balanced, and provide the advantage of increasing the steering stability of the tire.

BRIEF DESCRIPTION OF THE DRAWING(S)

FIGS. 6A-6B include a table showing results of performance testing of pneumatic tires according to embodiments of the present technology.

FIGS. 7A-7B include a table showing results of performance testing of pneumatic tires according to embodiments of the present technology.

FIGS. 8A-8B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
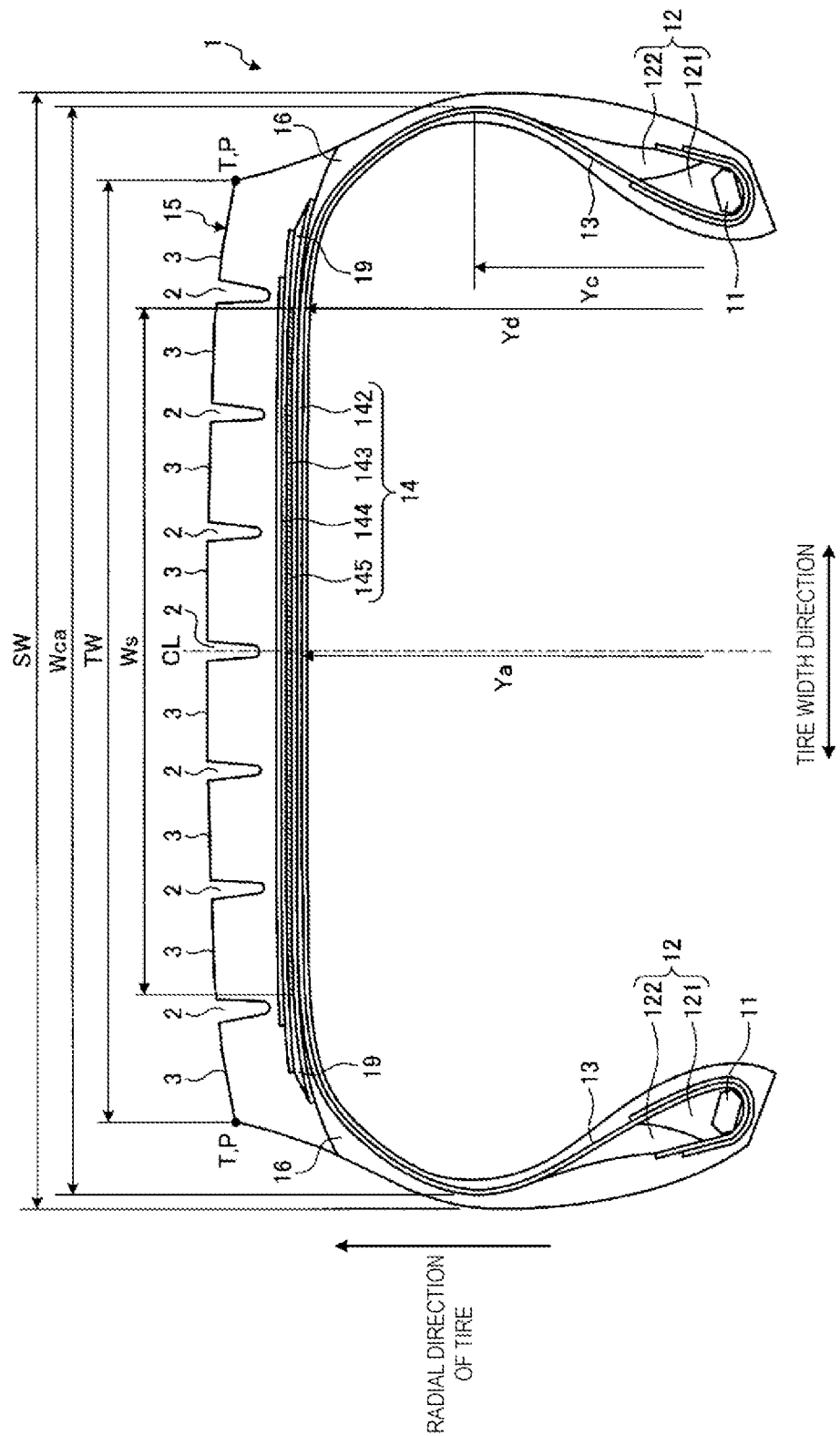
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a plurality of belt plies 142, 143, 144, and 145, and is disposed to extend over a periphery of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16,16 is disposed on each outer side of the carcass layer 13 in the tire width direction, so as to form left and right sidewall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. The land portions 3 are a series of ribs along the tire circumferential direction, or a row of blocks partitioned by a plurality of lug grooves (not shown) in the tire circumferential direction.

Here, "circumferential main grooves" refers to circumferential grooves having a groove width of 5.0 mm or greater. The groove widths of the circumferential main grooves are measured excluding the notched portions and/or the chamfered portions formed at the groove opening portion.

The left and right circumferential main grooves 2, 2 located on the outermost side in the tire width direction of the pneumatic tire 1 are referred to as the outermost main circumferential grooves. The left and right land portions 3, 3 on the outside in the tire width direction which define the left and right outermost circumferential main grooves 2, 2 are called the shoulder land portion.

Belt Layer

Figure 2:
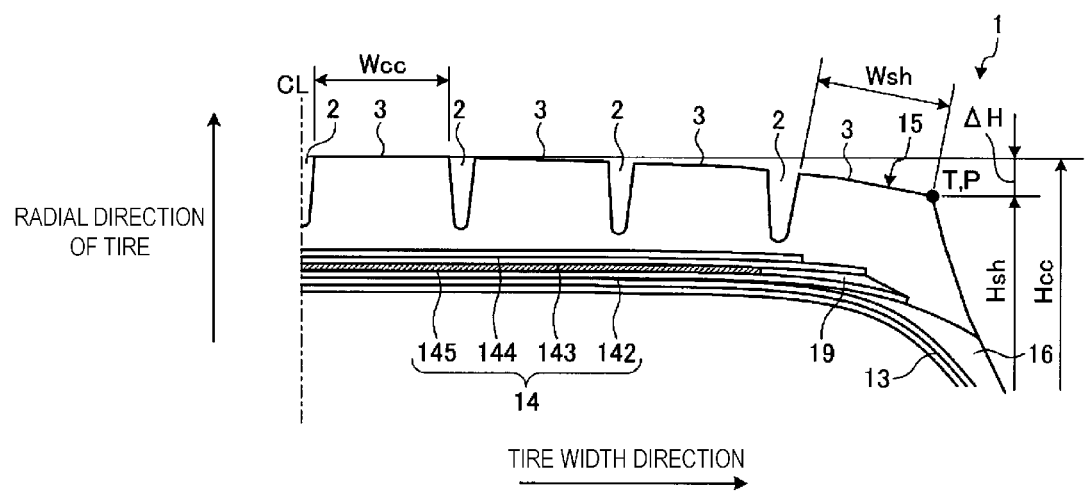
FIG. 2 is an explanatory view illustrating a belt layer of the pneumatic tire depicted in FIG. 1.
Figure 3:
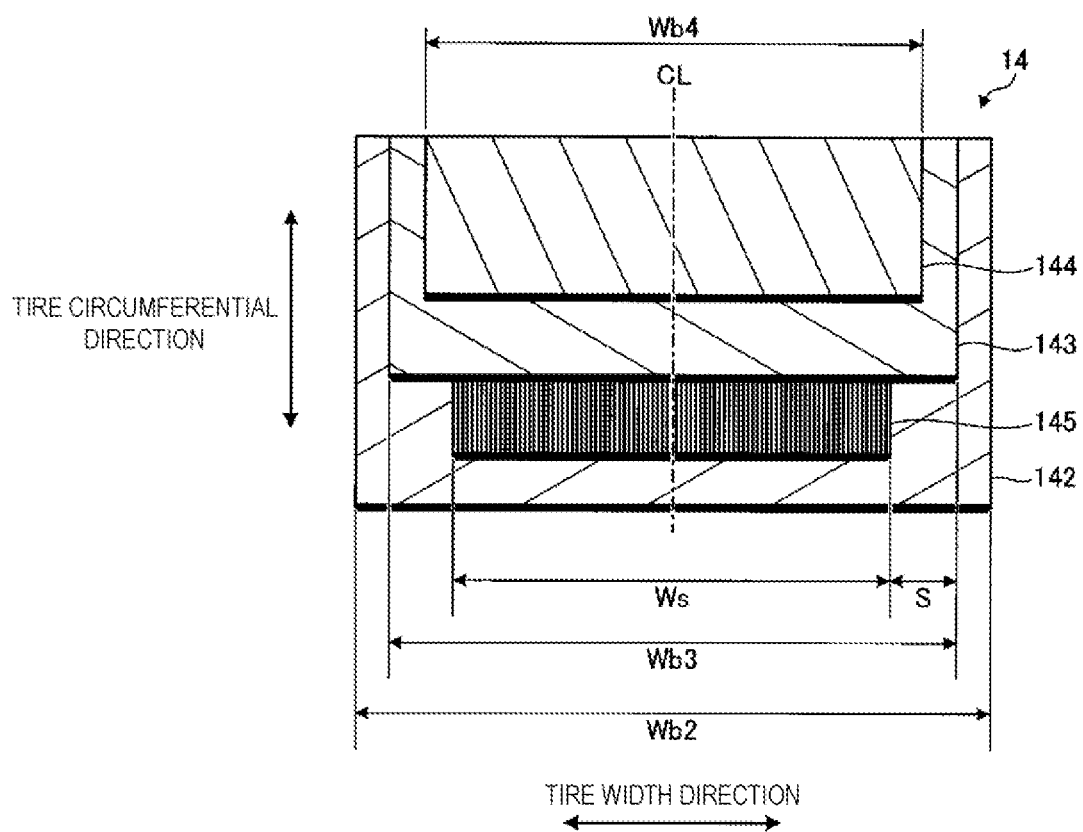
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. In FIG. 3 the thin lines of the center of the belt plies 142 to 145 are schematic representations of the belt cords for the belt plies 142 to 145.

The pair cross belts 142, 143, the supplemental belt (low-angle belt) 144, and the circumferential reinforcing layer 145 are laminated to form the belt layer. The belt layer 14 is arranged at the outer periphery encircling the carcass layer (refer to FIG. 2).

The pair of cross belts 142, 143 are configured by rolling a plurality of belt cords made from steel or organic woven fibers coated with coating rubber. The pair of cross belts 142, 143 preferably has a belt angle with an absolute value from 46° to 80°, inclusive (the angle of inclination of the belt cord in the fiber direction in relation to the tire circumferential direction), and is more preferably from 51° to 70°, inclusive. Additionally, the pair of cross belts 142, 143 have belt angles that are of mutually opposite signs, and are laminated so that the fiber directions of the belt cords intersect with each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not shown).

The supplemental belt 144 may also be configured by coating a plurality of belt cords made from steel or organic woven fibers coated with coating rubber and rolling the coated steel or fibers. The supplemental belt 144 preferably has a belt angle with an absolute value from 10° to 45°, inclusive, and may more preferably have a belt angle with an absolute value from 15° to 30°, inclusive. The supplemental belt 144 may be laminated on the outermost side of the pair of cross belts 142, 143 in the radial direction of the tire. In the configuration illustrated in FIG. 1, the supplemental belt 144 is laminated on the outermost portion in the radial direction of the tire and also functions as a belt cover for the most radially outward cross belt 143.

The circumferential reinforcing layer 145 is configured by steel belt cords coated with coating rubber and wound in a spiral manner with an inclination within a range of ±5° with respect to the tire circumferential direction. Specifically, the circumferential reinforcing layer 145 is formed by winding one or a plurality of wires in a spiral manner around the periphery of the inner-side cross belt 142. Additionally, the circumferential reinforcing layer 145 is disposed so as to be interposed between the pair of cross belts 142, 143. Furthermore, the circumferential reinforcing layer 145 is disposed inward in the tire width direction of left and right edges of the pair of cross belts 142, 143. The circumferential reinforcing layer 145 reinforces the rigidity in the tire circumferential direction.

In the pneumatic tire 1, the belt layer 14 may have an edge cover (not shown). Generally, the edge cover is configured by a plurality of belt cords formed from steel or organic fibers covered with coating rubber and subjected to a rolling process, having a belt angle, as an absolute value, of not less than 0° and not more than 5°. Additionally, edge covers are disposed outward in the tire radial direction of the left and right edges of the outer-side cross belt 143 (or the inner-side cross belt 142). The edge cover mitigates the difference in the increase in diameter between the center region of the tread portion and the shoulder region.

The inner-side cross belt 142 is arranged adjacent to the carcass layer 13. Therefore the inner-side cross belt 142 forms the innermost layer of the belt layer 14 in the radial direction of the tire; there are no other belt plies arranged between the inner-side cross belt 142 and the carcass layer 13.

The inner-side cross belt 142 and the outer-side cross belt 143 are each arranged next to the circumferential reinforcing layer 145 with the circumferential reinforcing layer 145 interposed between the inner-side cross belt 142 and the outer-side cross belt 143. Therefore, there are no other belt plies arranged among the inner-side cross belt 142, the outer-side cross belt 143, and the circumferential reinforcing layer 145.

Specific Configuration of the Supplementary Belt

In the pneumatic tire 1, the supplemental belt 144 and the outer-side cross belt 143 which are next to each other, have belt angles of the same sign (refer to FIG. 3). For example, in the configuration illustrated in FIG. 3 the belt cords in the supplemental belt 144 are inclined downward and to the right in the FIG. 3. Therefore, the belt cords in the supplemental belt 144 and the belt cords in the outermost outer-side cross belt 143 have belt angles of the same sign because the belt cords are inclined in the same direction.

The supplemental belt 144 is arranged to cover the region where the outermost circumferential main groove 2 is distributed (refer to FIG. 2). Specifically, the supplemental belt 144 is arranged spanning the entire region of the width of the groove for the outermost circumferential main groove 2. Therefore, beneath the outermost circumferential main groove 2 is reinforced. Moreover, the supplemental belt 144 is arranged such that each partitioned portion of the supplemental belt 144 covers the region where the outermost circumferential main groove 2 is distributed when the supplemental belt 144 has the later described split structure (not shown).

The relationship between the width Wb4 of the supplemental belt 144, and the width Wb3 of the outer-side cross belt 143 satisfies $0.75 \leq Wb4/Wb3 \leq 0.95$ (refer to FIG. 3). Therefore, the supplemental belt 144 is narrower than the outer-side cross belt 143. Furthermore, the ratio of the width of the supplemental belt to the width of the outer-side cross belt Wb4/Wb3 is preferably 0.80≤Wb4/Wb3≤0.90.

The relationship between the width Wb4 of the supplemental belt 144 and the width Ws of the circumferential reinforcing layer 145 satisfies 1.02≤Wb4/Ws (refer to FIG. 3). Therefore, the supplemental belt 144 is wider than the circumferential reinforcing layer 145. The supplemental belt 144 preferably extend outside the outermost circumferential main groove 2 up to the outermost part in the tire width direction (refer to FIG. 2). Additionally, the upper limit of the ratio Wb4/Ws is not particularly limited, but may be bounded by the ratio Wb4/Wb3 and the later described ratio WS/Wb3.

The width of a belt ply is the distance between the left and right end of each belt ply in the tire rotation direction. The width of the belt ply is measured when the tire is installed on the prescribed rim and inflated to the prescribed internal pressure while there is no load.

When the belt ply has a widthwise bifurcated structure (not shown), the width of the belt ply is the distance between the outermost parts of the left and right partitioned portions in the tire width direction.

For the typical pneumatic tire, as illustrated in FIG. 1, the belt plies are structured to be symmetrical about the center of the tire equatorial plane CL. Therefore, the distance from the tire equatorial plane CL to the end portion outward in the tire width direction is half the width of the belt ply.

Herein, "prescribed rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Prescribed inner pressure" refers to "maximum air pressure" stipulated by JATMA, a maximum value in "tire load limits at various cold inflation pressures" defined by TRA, or "inflation pressures" stipulated by ETRTO. Note that "prescribed load" refers to "maximum load capacity" stipulated by JATMA, a maximum value in "tire load limits at various cold inflation pressures" defined by TRA, or "load capacity" stipulated by ETRTO. However, with JATMA, in the case of passenger car tires, the prescribed internal pressure is an air pressure of 180 kPa, and the prescribed load is 88% of the maximum load capacity.

The belt cords in the supplemental belt 144 are steel wires having an end count from 15 (strands per 50 mm) to 25 (strands per 50 mm), inclusive.

Improving the Steering Stability

The heavy-duty tires installed on trucks and buses in recent years have a low-profile on the one hand, and are provided with a circumferential reinforcing layer in the belt layer to maintain the shape of the tread portion. Specifically, the circumferential reinforcing layer is arranged in the center region of the tread portion and exhibits a hoop effect which controls the increase in the diameter and maintains the shape of the tread portion.

Given that the circumferential reinforcing layer increases the rigidity of the belt layer in the tire circumferential direction, the rigidity in the tire width direction becomes relatively low. Thus, the rigidity in the tire circumferential direction and in the tire width direction are not uniform, which disadvantageously lowers the steering stability of the tire. This kind of defect is becomes strikingly apparent when in particular the pneumatic tire is used for a long period of time under high pressure and under a heavy-duty load.

Regarding this point, as above illustrated, the pair of cross belts 142, 143 function as high-angle belts in the pneumatic tire 1 to secure the rigidity in the tire width direction. The circumferential reinforcing layer 145 and the supplemental belt 144 function as low-angle belts, to secure the rigidity in the tire circumferential direction. The rigidity in the tire circumferential direction and the tire width direction are thereby balanced, improving the steering stability of the tire.

The Rounded Shoulder Portion

Figure 4:
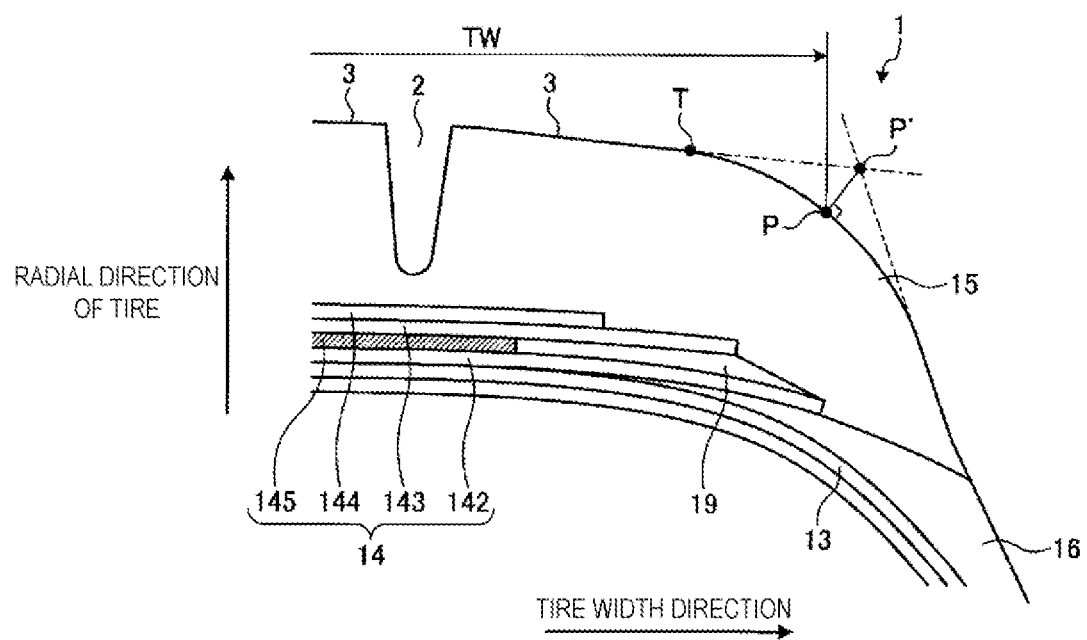
FIG. 4 is an explanatory view illustrating a modified example of the pneumatic tire depicted in FIG. 1.

FIG. 4 is an explanatory view of a modified example of the pneumatic tire depicted in FIG. 1. In FIG. 4 the pneumatic tire depicted has a rounded shoulder portion.

In the configuration illustrated in FIG. 1, and as illustrated in FIG. 2, when the shoulder portion is square, the tire ground contact edge T and the tread edge P coincide. That is, in a squared shoulder configuration, a point on the edge portion of the square corresponds to the tread edge P.

However without being limited to this configuration, the shoulder may be rounded as illustrated in FIG. 4. When the shoulder is rounded, as above mentioned, an intersection point P' is taken of the tread portion profile and the sidewall portion profile in a cross sectional view along the tire meridian direction; the foot of a vertical line drawn from this intersection point P' toward the shoulder portion is considered the tread end P. Therefore, the tire ground contact edge T and the tread edge P are usually at mutually different positions.

Additional Data

In FIG. 1, the relationship between the tread width TW and the total tire width SW satisfies 0.83≤TW/SW≤0.95. The ratio TW/SW preferably satisfies 0.83≤TW/SW≤0.95.

The total tire width SW refers to a linear distance (including all portions such as letters and patterns on the tire surface) between the side walls when the tire is assembled on a prescribed rim and inflated to a prescribed internal pressure and is in an unloaded state.

The tread width TW is the distance measured between the left and right tread edges P, P along the tire rotation direction, when the tire is assembled on a prescribed rim, is inflated to a prescribed internal pressure and is in an unloaded state.

The relationship between the tread width TW and the cross-sectional width Wca of the carcass layer 13 satisfies 0.82≤TW/Wca≤0.92.

The cross-sectional width Wca of the carcass layer 13 refers to a linear distance between the left and right maximum width positions of the carcass layer 13 when the tire is assembled on a prescribed rim, is inflated to a prescribed internal pressure and is in an unloaded state.

In FIG. 1, the relationship between the diameter Ya at the highest position on the carcass layer 13 and the diameter Yc at the widest position of the carcass layer 13 satisfies 0.80≤Yc/Ya≤0.90. Additionally, the relationship between the diameter Ya at the highest position on the carcass layer 13 and the diameter Yd of the carcass layer 13 at the end position of the circumferential reinforcing layer 145 satisfies 0.95≤Yd/Ya≤1.02. These relationships allocate an appropriate cross-sectional shape for the carcass layer 13 and equalizes the distribution of the ground contact pressure on the tire.

The diameter Ya at the highest position on the carcass layer 13 is the distance measured from the tire rotation axis to the intersection of the tire equatorial plane CL and the carcass layer 13 measured when the tire is assembled on a prescribed rim, is inflated to a prescribed internal pressure, and is in an unloaded state.

The diameter Yc at the widest position of the carcass layer 13 is the distance measured from the tire rotational axis to the widest position of the carcass layer 13 when the tire is assembled on a prescribed rim, is inflated to a prescribed internal pressure, and is in an unloaded state.

A point Q3 (not shown) is an intersection between a perpendicular line drawn along the radial direction of the tire from the end portion of the circumferential reinforcing layer 145, and the carcass layer 13. The diameter Yd of the carcass layer 13 at the end position of the circumferential reinforcing layer 145 is the distance measured from the tire rotation axis to the point Q3 when the tire is assembled on a prescribed rim, is inflated to a prescribed internal pressure, and is in an unloaded state.

In FIG. 2, the relationship between the outer diameter Hcc of the tread profile in the tire equatorial plane CL, and the outer diameter Hsh of the tread profile at the tire ground contact edge T satisfies $0.010 \leq (Hcc-Hsh)/Hcc \leq 0.015$ (refer to FIG. 2). As a result, a shoulder rounding amount $\Delta H (=Hcc-Hsh)$ in the shoulder region is made appropriate.

The outer diameters Hcc, Hsh of the tread profile are the diameters measured for the tread profile about the tire rotation axis when the tire is assembled on a prescribed rim, is inflated to a prescribed internal pressure, and is in an unloaded state.

The "tire ground contact edge T" refers to the maximum width position in a tire axial direction of a contact surface between the tire and a flat plate in a configuration in which the tire is assembled on a prescribed rim, inflated to a prescribed inner pressure, placed perpendicularly to the flat plate in a static state, and loaded with a load corresponding to a prescribed load.

In FIG. 1, the relationship between the actual tire ground contact width Wg (not shown) and the total tire width SW satisfies $0.60 \leq Wg/SW \leq 0.80$.

As a result, the ratio Wg/SW of the tire actual ground contact width Wg to the total tire width SW is made appropriate.

The actual tire ground contact width Wg is calculated as the difference between the ground contact width of the whole tire and the sum of the groove widths of all the circumferential main grooves 2.

The ground contact width is a total of the distances measured along the tread surface of the land portions when the tire is assembled on a prescribed rim, is inflated to a prescribed internal pressure, and is in an unloaded state.

The relationship between the ground contact width Wsh of the shoulder land portion 3 and the tread width TW satisfies $0.10 \leq Wsh/TW \leq 0.20$ (refer to FIG. 1 and FIG. 2). Thus, the relationship $0.10 \leq Wsh/TW \leq 0.20$ allocates an appropriate ground contact width Wsh of the shoulder land portion 3.

The relationship between the ground contact width Wcc of the land portion 3 closest to the tire equatorial plane CL, and the ground contact width Wsh of the outermost land portion 3 in the tire width direction satisfies $0.80 \leq Wsh/Wcc \leq 1.30$ (refer to FIG. 2). Additionally, the ratio of the ground contact widths Wsh/Wcc preferably satisfies the range $0.90 \leq Wsh/Wcc \leq 1.20$.

The land portion 3 closest to the tire equatorial plane CL refers to this land portion 3 when there is a land portion 3 in the tire equatorial plane CL. If there is a circumferential main groove 2 on the tire equatorial plane CL, the land portion 3 closest to the tire equatorial plane CL refers to the land portion 3 on the same side as the shoulder land portion 3 used for comparison of the left and the right land portions 3, 3 defined by the circumferential main groove 2. For instance, in a configuration having a bilaterally asymmetrical tread pattern (not shown), if the circumferential main groove 2 is on the tire equatorial plane CL, the ratio Wsh/Wcc is measured between the ground contact width Wcc of the land portion 3 closest to the tire equatorial plane CL, and the ground contact width Wsh of the shoulder land portion 3 at one of the side regions that bounds the tire equatorial plane CL.

In FIG. 3, the relationship between the width Wb3 of the narrower of the inner-side cross belt 142 and the outer-side cross belt 143 and the width Ws of the circumferential reinforcing layer 145 preferably satisfies $0.70 \leq Ws/Wb3 \leq 0.90$. In FIG. 1, the outer-side cross belt 143 is the narrower t. The relationship $0.70 \leq Ws/Wb3 \leq 0.90$ thereby allocates an appropriate width Ws for the circumferential reinforcing layer 145.

The widths Wb2, Wb3 of the cross belts 142, 143 is the distance measured between the left and right end portions of the cross belts 142, 143 in the tire rotation direction when the tire is assembled on a prescribed rim, is inflated to a prescribed internal pressure, and is in an unloaded state.

In FIG. 1 and FIG. 3, the relationship between width Wb2 of the wider of the inner-side cross belt 142 and the outer-side cross belt 143 and the cross-sectional width Wca of the carcass layer 13 satisfies $0.73 \leq Wb2/Wca \leq 0.89$. In FIG. 1, the inner-side cross belt 142 is the wider cross belt. Additionally, the ratio of the widths Wb2/Wca is preferably within the range of $0.78 \leq Wb2/Wca \leq 0.83$.

Moreover, a width Ws of the circumferential reinforcing layer 145 and a cross-sectional width Wca of the carcass layer 13 have a relationship of $0.60 \leq Ws/Wca \leq 0.70$.

In FIG. 1, the relationship between the tread width TW and the width Ws of the circumferential reinforcing layer 145 in the pneumatic tire 1 preferably satisfies $0.70 \leq Ws/TW \leq 0.90$.

Additionally, as illustrated in FIG. 3, the circumferential reinforcing layer 145 is arranged further inside in the tire width direction from the left and right edge portion of the narrower of the pair of cross belts (the inner-side cross belt 142 and the outer-side cross belt 143). In FIG. 1, this narrower cross belt is the outer-side cross belt 143. It is also preferable that the width Wb3 of the narrower cross belt 143 and the distance S from the edge portion of the circumferential reinforcing layer 145 to the edge portion of the narrower cross belt 143 are in the ranges of $0.03 \leq S/Wb3 \leq 0.12$. An appropriate distance may be thereby allocated between width Wb3 of the cross belt 143 and an end portion of the circumferential reinforcing layer 145. This point is the same even if the circumferential reinforcing layer 145 has a divided structure (not shown).

The distance S of the circumferential reinforcing layer 145 is measured as a distance in the tire width direction when the tire is assembled on a prescribed rim, inflated to a prescribed inner pressure, and no load is applied. In the configuration illustrated in FIG. 1, and as illustrated in FIG. 3, the circumferential reinforcing layer 145 is configured by winding a strand of steel wire into a spiral. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably not more than 12 mm. As a result, a plurality of wires (not less than 2 and not more than 5 wires) can be wound properly at a slant within a range of ±5° with respect to the tire circumferential direction.

The belt cords of the pair of cross belts 142, 143 are steel wires; the pair of cross belts 142, 143 preferably have an end count from 18 (strands per 50 mm) to 28 (strands per 50 mm), inclusive, and more preferably may have an end count from 20 (strands per 50 mm) to 25 (strands per 50 mm). Also, the belt cords that constitute the circumferential reinforcing layer 145 are steel wire, and the circumferential reinforcing layer 145 preferably has not less than 17 ends/50 mm and not more than 30 ends/50 mm. Hereby, the belt plies 142, 143, 145 may be allocated an appropriate strength.

Moreover, moduli E2, E3 at 100% elongation of the coating rubbers of the pair of cross belts 142, 143, and the modulus Es at 100% elongation of the coating rubber of the circumferential reinforcing layer 145 preferably have a relationship such that $0.90 \leq Es/E2 \leq 1.10$ and $0.90 \leq Es/E3 \leq 1.10$. Moreover, the modulus Es at 100% elongation of the coating rubber of the circumferential reinforcing layer 145 preferably is in ranges such that $4.5\ MPa \leq Es \leq 7.5\ MPa$. As a result, the moduli of the belt plies 142, 143, 145 are made appropriate.

The modulus at 100% elongation is measured in a tensile test at ambient temperature in conformance with JIS K6251 (using dumbbell no. 3).

Moreover, breaking elongations $\lambda 2$, $\lambda 3$ of the coating rubbers of the pair of cross belts 142, 143 are both preferably equal to or greater than 200%. Furthermore, a breaking elongation $\lambda s$ of the coating rubber of the circumferential reinforcing layer 145 is preferably equal to or greater than 200%. Hereby, the belt plies 142, 143, 145 may be allocated an appropriate durability.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min.

Elongation is preferably not less than 1.0% and not more than 2.5% when the tensile load of the belt cords as components that configure the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have good elongation ratio when a low load is applied compared with normal steel wire, and they can withstand the loads that are applied to the circumferential reinforcing layer 145 during the time from manufacture until the tire is used, so that it is possible to suppress damage to the circumferential reinforcing layer 145, which is desirable.

The elongation of the belt cord is measured in accordance with JIS G3510.

The breaking elongation of the tread rubber 15 in the pneumatic tire 1 is preferably within the range of not less than 400%, and is more preferably not less than 450%. This breaking elongation provides an appropriate strength for the tread rubber 15. The upper limit of the breaking elongation of the tread rubber 15 is not particularly limited, however the strength of the tread rubber 15 may be limited to the type of rubber compound used therefor.

The hardness of the tread rubber 15 in the pneumatic tire 1 is preferably within a range of not less than 60. Hereby, the tread rubber 15 may be allocated an appropriate hardness. While the upper limit of the hardness of the tread rubber 15 is not particularly limited, the hardness of the tread rubber 15 may be limited by the type of rubber compound use therefor.

Here, "rubber hardness" refers to JIS-A hardness in accordance with JIS-K6263.

Belt Edge Cushion Two-Color Structure

Figure 5:
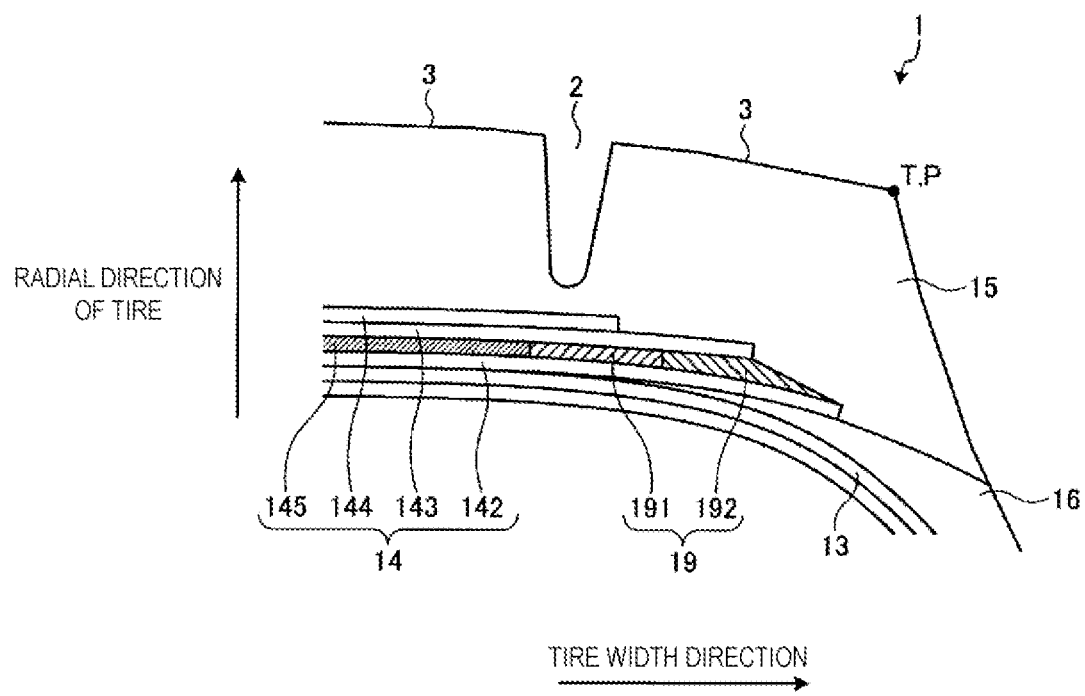
FIG. 5 is an explanatory view illustrating a modified example of the pneumatic tire depicted in FIG. 1.

FIG. 5 is an explanatory view of a modified example of the pneumatic tire depicted in FIG. 1. FIG. 5 is an enlarged view of an end portion of the belt layer 14 on the outer side in the tire width direction. In FIG. 5, the circumferential reinforcing layer 145 and the belt edge cushion 19 are indicated by hatching.

In the configuration illustrated in FIG. 1, the circumferential reinforcing layer 145 is disposed inward in the tire width direction of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

Conversely, according to the configuration in FIG. 5, the belt edge cushion 19 in the configuration in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion of the circumferential reinforcing layer 145 on the outer side in the tire width direction to the edge portion of the pair of cross belts 142, 143.

In the configuration illustrated in FIG. 5, the relationship between the modulus Ein at 100% elongation of the stress relief rubber 191, and the modulus Es at 100% elongation of the coating rubber for the circumferential reinforcing layer 145 satisfies Ein<Es. Specifically, the relationship between the modulus Ein of the stress relief rubber 191 and the modulus Es of the circumferential reinforcing layer 145 preferably satisfies $0.6 \leq Ein/Es \leq 0.9$. Moreover, a modulus Ein at 100% elongation of the stress relief rubber 191 and the modulus Eco at 100% elongation of the coating rubber of the cross belts 142, 143 have a relationship of Ein<Eco in the configuration in FIG. 5. Specifically, the modulus Ein of the stress relief rubber 191 and the modulus Eco of the coating rubber preferably have a relationship such that $0.6 \leq Ein/Eco \leq 0.9$.

Furthermore, in the configuration illustrated in FIG. 5, the relationship between the modulus Eout at 100% elongation of the end portion relief rubber 192, and the modulus Ein at 100% elongation of stress relief rubber 191 preferably satisfies Eout<Ein. Additionally, the modulus Ein at 100% elongation of the stress relief rubber 191 preferably is within a range such that 4.0 MPa≤Ein≤5.5 MPa.

Since the stress relief rubber 191 is disposed on the outer side of the circumferential reinforcing layer 145 in the tire width direction in the configuration of FIG. 5, shearing strain of the periphery rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

Effect

As described above, the pneumatic tire 1 includes the carcass layer 13, the belt layer 14 arranged outside of the carcass layer 13 in the tire radial direction, and the tread rubber 15 arranged outside of the belt layer 14 in the tire radial direction (see FIG. 1). The pneumatic tire 1 also includes at least three circumferential main grooves 2 extending in the tire circumferential direction, and a plurality of land portions 3 defined by the circumferential main grooves 2. The belt layer 14 is provided with the inner-side cross belt 142 and the outer-side cross belt 143 forming belt angles with the tire circumferential direction having an absolute value from 46° to 80°, inclusive, where the belt angles each have the same sign; the circumferential reinforcing layer 145 forming a belt angle with the tire circumferential direction of ±5° and arranged between the inner-side cross belt 142 and the outer-side cross belt 143; and the supplemental belt 144 forming a belt angle with the tire circumferential direction having an absolute value from 10° to 45°, inclusive, and arranged outward of the outer-side cross belt 143 in the radial direction of the tire (refer to FIG. 2 and FIG. 3).

In this configuration, the pair of cross belts 142, 143 function as high-angle belts to secure the rigidity in the tire width direction. The circumferential reinforcing layer 145 and the supplemental belt 144 function as low-angle belts, to secure the rigidity in the tire circumferential direction. Hereby, the rigidity of the tire in the circumferential direction and the rigidity of the tire in the width direction are balanced are appropriately balanced, and provide the advantage of increasing the steering stability of the tire.

In the above-mentioned configuration, and particularly given that the pair of cross belts 142, 143 function as high-angle belts, an additional high-angle belt may be excluded. (For instance, belt plies arranged between the carcass layer and the inner-side cross belt forming an absolute angle from 45° to 70°, inclusive, may be omitted). Hereby the above-mentioned configuration advantageously provides a lighter weight tire.

Additionally, in the above-mentioned configuration the pair of cross belts 142, 143 which have a belt angle largely inclined relative to the tire width direction, and the circumferential reinforcing layer 145 and the supplemental belt 144 which have a belt angle largely inclined relative to the tire circumferential direction, are alternately laminated. Therefore, for instance, compared to a configuration (not shown) where the circumferential reinforcing layer is arranged on the inside of the pair of cross belts in the radial direction of the tire, or arranged on the outside of the pair of cross belts in the radial direction of the tire, the rigidity of the tire is equally distributed among the belt plies 142, 143 144, 145 in the radial direction of the tire. This has the advantage of improving the durability of the tire.

Furthermore, in the above-mentioned configuration, compared to a configuration (not shown) where the supplemental belt is provided on the inside of the pair of cross belts in the radial direction of the tire, the cross belts 142, 143 which have a high belt angle are arranged far away from and outside of the central axis about which the tire curves on contact with the ground (i.e. closer to the inside in the radial direction) because the supplemental belt 144 is arranged on the outer side of the pair of cross belts 142, 143 in the radial direction of the tire. Thus, the supplemental belt provides the advantage of effectively reinforcing the rigidity in the tire width direction.

In the pneumatic tire 1, the supplemental belt 144 and the outer-side cross belt 143 which are next to each other, have belt angles of the same sign (refer to FIG. 3). In this configuration, compared to a configuration (not shown) where the supplemental belt and the outer-side cross belt have belt angles of different signs, the supplemental belt 144 and the outer-side cross belt provide a small hoop effect. Therefore, the increase in rigidity in the circumferential direction of the tire is mitigated while the rigidity between the tire circumferential direction and the tire width direction is appropriately balanced.

The inner-side cross belt 142 is arranged next to the carcass layer 13 in the pneumatic tire 1 (refer to FIG. 2 and FIG. 3). In this configuration, for instance, compared to a configuration where there is a high-angle belt (with an absolute angle from 45° to 70°, inclusive) between the inner-side cross belt on the carcass layer, it possible to reduce the number of belt plies by at least one while maintaining the same function and therefore provide a lighter weight tire.

The relationship between the width Wb4 of the supplemental belt 144 and width Wb3 of the outer-side cross belt 143 in the pneumatic tire 1 satisfies 0.75≤Wb4/Wb3≤0.9. The ratio of the widths Wb4/Wb3 may thus be optimized and provide an appropriate balance of the rigidity in the tire circumferential direction and the rigidity in the tire width direction. That is, the relationship 0.75≤Wb4/Wb3 ensures that the supplemental belt 144 reinforces the rigidity in the tire circumferential direction, while the relationship Wb4/Wb3≤0.95 prevents the tire from becoming too rigid in the tire circumferential direction.

The belt cords of the supplemental belt 144 in the pneumatic tire 1 are steel wires having an end count from 15 (strands per 50 mm) to 25 (strands per 50 mm), inclusive. Hereby, the belt cords enable the supplemental belt 144 to provide the tire with the appropriate rigidity in the tire circumferential direction.

The relationship between the diameter Ya at the highest position on the carcass layer 13 and the diameter Yc at the widest position of the carcass layer 13 satisfies 0.80≤Yc/Ya≤0.90 (refer to FIG. 1).

This relationship provides an optimized cross-sectional shape for the carcass layer 13 to even out the distribution of the ground contact pressure on the tire.

The relationship between the width Wb3 of the wider of inner-side cross belt 142 and the outer-side cross belt 143 (in FIG. 1, the inner-side cross belt 142), and the cross-sectional width Wca of the carcass layer 13 in the pneumatic tire 1 satisfies 0.73≤Wb2/Wca≤0.89 (refer to FIG. 1 and FIG. 3). Hereby, the ratio of the widths Wb2/Wca may be optimized. That is, the relationship 0.73≤Wb2/Wca suppresses an increase in the diameter of the tire in the shoulder region.

Also, fatigue rupture of the belt cords at the edge portions of the wider cross belt 142 is suppressed due to the ratio Wb2/Wca being less than or equal to 0.89.

The relationship between the width Ws of the circumferential reinforcing layer 145 and the cross-sectional width Wca of the carcass layer 13 in the pneumatic tire 1 satisfies 0.60≤Ws/Wca≤0.70 (refer to FIG. 1). The ratio Ws/Wca may thus be optimized. That is, the relationship 0.60≤Ws/Wca allocates an appropriate width Ws for the circumferential reinforcing layer 145 and suppresses the raising of the tread portion near the end portion of the circumferential reinforcing layer 145 (the region in one fourth of the tread width TW), and thus allocates an appropriate amount of the ground contact pressure to the shoulder land portion 3. The relationship Ws/Wca≤0.70 mitigates the difference in diameter between the central portion and the end portion of the circumferential reinforcing layer 145, reduces the tension on the circumferential reinforcing layer 145 caused by the repeated warping and unwarping of the tire while the tire rotates, and suppresses breakage of the belt cords at the end portion of the circumferential reinforcing layer 145 due to wear.

The relationship between the actual tire ground contact width Wg (not shown), and the total tire width SW (refer to FIG. 1) satisfies 0.60≤Wg/SW≤0.80. The ratio Wg/SW may thus be optimized. That is, the relationship 0.60≤Wg/SW allocates an appropriate amount of ground contact surface area on the tire. Furthermore, the relationship Wg/SW≤0.80 suppresses the deterioration of the ground contact pressure on the shoulder land portion 3 caused by an excessively large tread width TW (actual tire ground contact width Wg).

Moreover, in the pneumatic tire 1, the outer diameter Hcc of the tread profile at the tire equatorial plane CL and the outer diameter Hsh of the tread profile at the tire ground contact edge T have a relationship of 0.010≤(Hcc−Hsh)/Hcc≤0.015 (see FIG. 2). As a result, there is an advantage that the amount of shoulder rounding ΔH (=Hcc−Hsh) in the shoulder region is made appropriate. That is, the relationship of 0.010≤(Hcc−Hsh)/Hcc suppresses an increase in the ground contact length of the shoulder region and provides an even distribution of the ground contact pressure. Additionally, the relationship of (Hcc−Hsh)/Hcc≤0.015 reduces the shoulder drop-off ΔH in the shoulder region and provides an even distribution of the ground contact pressure.

The relationship between the ground contact width Wsh in the shoulder land portion 3, and the tread width TW in the pneumatic tire 1 satisfies 0.1≤Wsh/TW≤0.2 (refer to FIG. 1 and FIG. 2). The ground contact width Wsh in the shoulder land portion 3 is thus optimized. That is, the relationship 0.1≤Wsh/TW secures an appropriate ground contact surface area for the shoulder land portion 3. Furthermore, the relationship Wsh/TW≤0.2 reduces the ground contact surface area for the shoulder land portion 3 outside of the region where the belt layer is disposed, thus providing the appropriate rigidity for the shoulder land portion 3.

The relationship between the ground contact width Wcc of the land portion 3 closest to the tire equatorial plane CL, and the ground contact width Wsh of the land portion 3 outermost in the tire width direction in the pneumatic tire 1 satisfies 0.80≤Wsh/Wcc≤1.30 (refer to FIG. 2). The ratio Wsh/Wcc may thus be optimized. That is, the relationship 0.80≤Wsh/Wcc optimizes the ground contact surface pressure of the shoulder land portion 3, and optimizes the distribution of the ground contact pressure in the tire width direction. Whereas, even if 1.30<Wsh/Wcc, increasing the ground contact surface pressure of the shoulder land portion 3 by increasing the ground contact width Wsh has little effect.

Additionally, in the pneumatic tire 1, the tread width TW and a cross-sectional width Wca of the carcass layer 13 have a relationship such that 0.82≤TW/Wca≤0.92 (see FIG. 1). In such a configuration, radial growth in the center region is suppressed due to the belt layer 14 having the circumferential reinforcing layer 145. Furthermore, a difference in radial growths between the center region and a shoulder region is alleviated and the ground contact pressure distribution in a tire width direction is made uniform due to the ratio TW/Wca being within the above range. This relationship evenly distributes the ground contact pressure on the tire. Specifically, the air volume inside the tire is secured and deformation suppressed due to TW/Wca being equal to or greater than 0.82. Moreover, the relationship TW/Wca≤0.92 suppresses the raising of the shoulder portion, and provides an even distribution of the ground contact pressure.

Also, in the pneumatic tire 1, the belt cords that constitute the circumferential reinforcing layer 145 is steel wire, and the circumferential reinforcing layer 145 has not less than 17 ends/50 mm and not more than 30 ends/50 mm. As a result, there is an advantage that the effect of suppressing radial growth in the center region is properly secured due to the circumferential reinforcing layer 145.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. Hereby, the circumferential reinforcing layer 145 can suppress an increase in the diameter of the center region of the tread portion.

In the pneumatic tire 1, elongation is not less than 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly secured due to the circumferential reinforcing layer 145.

In the pneumatic tire 1, the circumferential reinforcing layer 145 is arranged on the inner side from the left and right edge portions in the tire width direction (in FIG. 1 the outer-side cross belt 143) of the pair of the inner-side cross belt 142 and outer-side cross belt 143 (refer to FIG. 3). The pneumatic tire 1 includes the stress relief rubber 191 disposed between the pair of cross belts 142, 143 and at a position on the outer side of the circumferential reinforcing layer 145 in the tire width direction and flanking the circumferential reinforcing layer 145, and the edge portion relief rubber 192 disposed between the pair of cross belts 142, 143 and at a position on the outer side of the stress relief rubber 191 in the tire width direction and corresponding to the edge portions of the pair of cross belts 142, 143 (see FIG. 5).

In such a configuration, there is an advantage that fatigue rupture of the periphery rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the periphery rubber of the circumferential reinforcing layer 145 is suppressed.

The relationship between the modulus Ein 100% elongation of the stress relief rubber 191 and the modulus Eco at 100% elongation of the coating rubber for the pair of cross belts (the inner-side cross belt 142, and the outer-side cross belt 143) in the pneumatic tire 1 satisfies Ein<Eco (refer to FIG. 5). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

The relationship between the modulus Ein at 100% elongation of the stress relief rubber 191 and the modulus Eco at 100% elongation of the coating rubber for the pair of cross belts (the inner-side cross belt 142, and the outer-side cross belt 143) in the pneumatic tire 1 satisfies 0.60≤Ein/Eco≤0.90 (refer to FIG. 5). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Additionally, in the pneumatic tire 1, the modulus Ein at 100% elongation of the stress relief rubber 191 is in a range such that 4.0 MPa≤Ein≤5.5 MPa (see FIG. 5). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

The circumferential reinforcing layer 145 is arranged on the inner side from the left and right edge portions of the narrower cross belt (the outer-side cross belt 143 in FIG. 1) of the pair of cross belts the inner-side cross belt 142 and the outer-side cross belt 143 in the tire width direction in the pneumatic tire 1 (refer to FIG. 1). The relationship between the width Wb3 of the narrower cross belt 143 and the distance S from the edge portion of the circumferential reinforcing layer 145 to the edge portion of the narrower cross belt 143 is within the range of 0.03≤S/Wb3≤0.12 (refer to FIG. 3). The positional relationship S/Wb3 between the edge portion of the cross belts 142, 143 and the edge portion of the circumferential reinforcing layer 145 may thus be optimized. That is, the relationship of 0.03≤S/Wb3 allocates an appropriate distance between the edge portion and the portion of the circumferential reinforcing layer 145 and the end portion of the cross belts 143, and suppresses separation of the peripheral rubber from the belt plies 145, 143 at the end portion. Additionally, the relationship of S/Wb3≤0.12 allocates an appropriate width Ws for the circumferential reinforcing layer 145 relative to the width Wb3 of the cross belt 143, and bringing about the appropriate hoop effect from the circumferential reinforcing layer 145.

Target of Application

The pneumatic tire 1 is preferably applied to a heavy duty tire with an aspect ratio of not less than 40% and not more than 75% when assembled on a prescribed rim, inflated to the prescribed internal pressure, and the prescribed load is applied. A heavy duty tire has a higher load under use than a passenger car tire. Thus, a radial difference occurs easily between the region where the circumferential reinforcing layer is disposed and the regions on the outer side of the circumferential reinforcing layer in the tire width direction. Moreover, a ground contact shape having an hourglass shape occurs easily in the tire having the above-mentioned low aspect ratio. Therefore, particularly striking results may be obtained by adopting the circumferential reinforcing layer 145 in a heavy-duty tire.

EXAMPLES

FIGS. 6A to 8B are tables showing results of performance testing of pneumatic tires according to embodiments of the present technology.

The performance test involved evaluation of the steering stability of a plurality of test tires with mutually different parameters. During the evaluation, a test tire with a size of 315/60 R22.5 was installed on a 22.5"×9.00" rim. The test tire was inflated to an air pressure of 900 kPa.

The test tire was installed on a 4×2 tractor-trailer as a test vehicle, and the test vehicle was driven on a prescribed test course with the test tire under a load of 34.81 kN. Five test drivers tested the feel of the drive where conventional samples (20) were used as the base value, and the evaluation totals were summed. In these evaluations, higher scores were preferable. In particular, if an evaluation was greater than or equal to 110 (10 points above the base value of 100), the test tire was considered to have satisfactorily surpassed the conventional sample, and, if the evaluation were greater than or equal to 115, the test tire was considered to have dramatically surpassed the conventional sample.

The configuration of the test tire according to Working Example 1 is described in FIG. 1 through FIG. 3. The primary dimensions of the test tire were set to TW=275 mm, and Wca=320 mm. The pneumatic tires 1 of Working Examples 2 to 36 are modified examples of the test tire of Working Example 1.

The test tires representing the conventional samples were the configurations described in FIG. 1 through FIG. 3, further provided with a high-angle belt in between the inner-side cross belt and the carcass layer 13 having a belt angle of 60°. Accordingly, the structure of the belt layer 14 in the conventional test tire is a laminate of five layers of belt plies. Moreover, the pair of cross belts 142, 143 have a belt angle toward the tire circumferential direction (less than or equal to 45°).

As is clear from the test results illustrated herein, the test tires in Working Examples 1 to 36 exhibit improved tire steering stability.

What is claimed is:
1. A pneumatic tire comprising: a carcass layer; a belt layer arranged outside of the carcass layer in a radial direction of the tire; at least three circumferential main grooves provided with a tread rubber arranged outside the belt layer in the radial direction of the tire and extending in a tire circumferential direction; and a plurality of land portions defined by the circumferential main grooves;
the belt layer including an inner-side cross belt and an outer-side cross belt forming belt angles of mutually different signs with the tire circumferential direction with absolute values from greater than 60° to less than or equal to 80°, wherein the inner-side cross belt is a radially innermost ply of the belt layer;
a circumferential reinforcing layer arranged between the inner-side cross belt and the outer-side cross belt and forming a belt angle of ±5° with the tire circumferential direction; and
a supplemental belt arranged outside the outer-side cross belt in the radial direction of the tire and forming a belt angle with the tire circumferential direction with an absolute value from 10° to 45°, inclusive;

wherein a maximum acceptable belt angle for the supplemental belt is less than minimum acceptable belt angles for the inner side cross belt or the outer side cross belt; and a relationship between the width Wb4 of the supplemental belt, and the width Wb3 of the outer-side cross belt satisfies 0.75≤Wb4/Wb3≤0.95.

2. The pneumatic tire according to claim 1, wherein the supplemental belt and the outer-side cross belt have belt angles with the same sign.

3. The pneumatic tire according to claim 1, wherein the inner-side cross belt is arranged next to the carcass layer.

4. The pneumatic tire according to claim 1, wherein the belt cords in the supplemental belt are steel and have an end count from 15 (strands per 50 mm) to 25 (strands per 50 mm), inclusive.

5. The pneumatic tire according to claim 1, wherein a relationship between a diameter Ya at a highest position on the carcass layer and a diameter Yc at a widest position of the carcass layer satisfies 0.80≤Yc/Ya≤0.90.

6. The pneumatic tire according to claim 1, wherein a relationship between a width Wb2 of a wider cross belt of the inner-side cross belt and the outer-side cross belt, and a cross-sectional width Wca of the carcass layer satisfies 0.73≤Wb2/Wca≤0.89.

7. The pneumatic tire according to claim 1, wherein a relationship between a width Ws of the circumferential reinforcing layer and the cross-sectional width Wca of the carcass layer satisfies 0.60≤Ws/Wca≤0.70.

8. The pneumatic tire according to claim 1, wherein a relationship between a tire actual ground contact width Wg and a total tire width SW satisfies 0.60≤Wg/SW≤0.80.

9. The pneumatic tire according to claim 1, wherein a relationship between an outer diameter Hcc of a tread profile at a tire equatorial plane and an outer diameter Hsh of the tread profile at a tire ground contact edge satisfies 0.010≤(Hcc−Hsh)/Hcc≤0.015.

10. The pneumatic tire according to claim 1, wherein a relationship between a ground contact width Wsh of a shoulder land portion, and a tread width TW satisfies 0.10≤Wsh/TW≤0.20.

11. The pneumatic tire according to claim 1, wherein a relationship between a ground contact width Wcc of the land portion closest to the tire equatorial plane CL and the ground contact width Wsh of the outermost land portion in the tire width direction satisfies 0.80≤Wsh/Wcc≤1.30.

12. The pneumatic tire according to claim 1, wherein a relationship between the tread width TW and the cross-sectional width Wca of the carcass layer satisfies 0.82≤TW/Wca≤0.92.

13. The pneumatic tire according to claim 1, wherein the belt angle of the supplemental belt has a value of from 10° to 30°.

14. The pneumatic tire according to claim 1, wherein the belt angles of the inner-side cross belt and the outer-side cross belt have a value two times or greater a value of the belt angle of the supplemental belt.

15. A pneumatic tire comprising: a carcass layer; a belt layer arranged outside of the carcass layer in a radial direction of the tire; at least three circumferential main grooves provided with a tread rubber arranged outside the belt layer in the radial direction of the tire and extending in a tire circumferential direction; and a plurality of land portions defined by the circumferential main grooves;

the belt layer including an inner-side cross belt and an outer-side cross belt forming belt angles of mutually different signs with the tire circumferential direction with absolute values from greater than 60° to less than or equal to 80°, wherein the inner-side cross belt is adjacent to the carcass layer;

a circumferential reinforcing layer arranged between the inner-side cross belt and the outer-side cross belt and forming a belt angle of ±5° with the tire circumferential direction; and a supplemental belt arranged outside the outer-side cross belt in the radial direction of the tire and forming a belt angle with the tire circumferential direction with an absolute value from 10° to 45°, inclusive;

wherein a maximum acceptable belt angle for the supplemental belt is less than minimum acceptable belt angles for the inner side cross belt or the outer side cross belt; and a relationship between the width Wb4 of the supplemental belt, and the width Wb3 of the outer-side cross belt satisfies 0.75≤Wb4/Wb3≤0.95.

16. A pneumatic tire comprising: a carcass layer; a belt layer arranged outside of the carcass layer in a radial direction of the tire; at least three circumferential main grooves provided with a tread rubber arranged outside the belt layer in the radial direction of the tire and extending in a tire circumferential direction; and a plurality of land portions defined by the circumferential main grooves;

the belt layer including an inner-side cross belt and an outer-side cross belt forming belt angles of mutually different signs with the tire circumferential direction with absolute values from greater than 60° to less than or equal to 80°;

a circumferential reinforcing layer arranged between the inner-side cross belt and the outer-side cross belt and forming a belt angle of ±5° with the tire circumferential direction;

a supplemental belt arranged outside the outer-side cross belt in the radial direction of the tire and forming a belt angle with the tire circumferential direction with an absolute value from 10° to 45°, inclusive; and a relationship between the width Wb4 of the supplemental belt, and the width Wb3 of the outer-side cross belt satisfies 0.75≤Wb4/Wb3≤0.95.

\* \* \* \* \*